US012785875B2

(12) United States Patent
Iwai et al.

(10) Patent No.: US 12,785,875 B2
(45) **Date of Patent: *Nov. 3, 2026**

(54) COMMUNICATION APPARATUS, TERMINAL, AND COMMUNICATION METHOD

(71) Applicant: Panasonic Intellectual Property Corporation of America, Torrance, CA (US)

(72) Inventors: Takashi Iwai, Ishikawa (JP); Tomohumi Takata, Ishikawa (JP); Atsushi Matsumoto, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/757,284

(22) Filed: Jun. 27, 2024

(65) Prior Publication Data

US 2024/0349359 A1 Oct. 17, 2024

Related U.S. Application Data

(63) Continuation of application No. 18/352,624, filed on Jul. 14, 2023, now Pat. No. 12,052,769, which is a (Continued)

(30) Foreign Application Priority Data

Jan. 6, 2017 (JP) ................................ 2017-001230

(51) Int. Cl.
*H04L 5/00* (2006.01)
*H04W 72/1268* (2023.01)
*H04W 74/0833* (2024.01)

(52) U.S. Cl.
CPC ....... *H04L 5/0039* (2013.01); *H04W 72/1268* (2013.01); *H04W 74/0833* (2013.01)

(58) Field of Classification Search
CPC ... H04L 5/0039; H04L 5/0023; H04L 5/0053; H04L 5/0087; H04L 5/0094;
(Continued)

(56) References Cited

U.S. PATENT DOCUMENTS 8,576,787 B2 * 11/2013 Hooli .................... H04L 1/1671 370/479
9,814,040 B2 * 11/2017 Bhushan .............. H04L 1/1812
(Continued)

FOREIGN PATENT DOCUMENTS

CN 104303553 B * 5/2018 ............ H04W 76/27
EP 3361809 A1 * 8/2018 ............ H04W 72/12
(Continued)

OTHER PUBLICATIONS

Asterjadhi et al., "HE Variant HT Control—Buffer Status Report," IEEE 802.11-16/0806r0, Jul. 6, 2016. (11 pages).
(Continued)

*Primary Examiner* — Ayaz R Sheikh
*Assistant Examiner* — Louis Samara
(74) *Attorney, Agent, or Firm* — Seed Intellectual Property Law Group LLP

(57) ABSTRACT

A communication apparatus in the present disclosure comprises an AID generator, a Trigger frame generator, and a wireless transmitter/receiver. When a Trigger Type in a trigger frame is an RA trigger, the AID generator generates, as information for an AID12 subfield, information that is different from an AID. The Trigger frame generator generates a RA variant Trigger frame when the Trigger Type in the trigger frame is an RA trigger, and sets, in the AID12 subfield included in the RA variant Trigger frame, the
(Continued)

100 information output from the AID generator. The wireless transmitter/receiver transmits the Trigger frame, generated by the Trigger frame generator, to a terminal.

12 Claims, 15 Drawing Sheets

Related U.S. Application Data continuation of application No. 18/145,768, filed on Dec. 22, 2022, now Pat. No. 11,956,833, which is a continuation of application No. 16/464,658, filed as application No. PCT/JP2017/043908 on Dec. 7, 2017, now Pat. No. 11,570,816.

(58) Field of Classification Search
CPC ......... H04W 72/1268; H04W 74/0833; H04W 72/23; H04W 74/006; H04W 84/12; H04W 72/044
See application file for complete search history.

(56) References Cited

U.S. PATENT DOCUMENTS

| | | | | |
|---|---|---|---|---|
| 10,219,271 | B1 | 2/2019 | Hedayat et al. | |
| 10,334,598 | B2 * | 6/2019 | Loehr | H04W 72/0453 |
| 10,367,677 | B2 | 7/2019 | Parkvall et al. | |
| 10,440,656 | B2 * | 10/2019 | Fan | H04W 52/146 |
| 10,476,649 | B2 * | 11/2019 | Kim | H04B 7/063 |
| 10,477,576 | B2 | 11/2019 | Lou et al. | |
| 10,492,200 | B2 * | 11/2019 | Seo | H04W 72/20 |
| 10,524,243 | B2 * | 12/2019 | Shimezawa | H04L 5/0053 |
| 10,587,372 | B2 * | 3/2020 | Seo | H04L 1/00 |
| 10,630,410 | B2 * | 4/2020 | Parkvall | H04B 7/0452 |
| 10,630,447 | B2 * | 4/2020 | Ouchi | H04B 7/04 |
| 2010/0254289 | A1 * | 10/2010 | Lim | H04L 5/1469 370/344 |
| 2012/0057547 | A1 * | 3/2012 | Lohr | H04L 5/0007 370/329 |
| 2013/0058304 | A1 | 3/2013 | Kim et al. | |
| 2013/0336299 | A1 * | 12/2013 | Lee | H04L 5/0055 370/336 |
| 2016/0007337 | A1 * | 1/2016 | Hessler | H04W 72/52 370/230 |
| 2016/0044676 | A1 | 2/2016 | Choi et al. | |
| 2016/0095133 | A1 * | 3/2016 | Hwang | H04L 1/1887 370/329 |
| 2016/0150532 | A1 * | 5/2016 | Bhushan | H04W 72/23 370/336 |
| 2016/0352551 | A1 * | 12/2016 | Zhang | H04L 5/0007 |
| 2016/0360443 | A1 | 12/2016 | Hedayat | |
| 2017/0099220 | A1 | 4/2017 | Adachi et al. | |
| 2017/0127441 | A1 * | 5/2017 | Chandrasekhar | H04W 28/0278 |
| 2017/0127453 | A1 | 5/2017 | Adachi et al. | |
| 2017/0196010 | A1 | 7/2017 | Matsuo et al. | |
| 2017/0215171 | A1 * | 7/2017 | Sun | H04L 5/0091 |
| 2017/0230939 | A1 * | 8/2017 | Rudolf | H04W 4/70 |
| 2017/0230954 | A1 * | 8/2017 | Au | H04L 27/26025 |
| 2017/0273083 | A1 | 9/2017 | Chen et al. | |
| 2017/0289987 | A1 | 10/2017 | Seok | |
| 2017/0331670 | A1 * | 11/2017 | Parkvall | H04L 41/0233 |
| 2018/0007673 | A1 * | 1/2018 | Fwu | H04W 72/12 |
| 2018/0063834 | A1 * | 3/2018 | Abedini | H04W 72/23 |
| 2018/0076992 | A1 | 3/2018 | Nabetani et al. | |
| 2018/0092127 | A1 | 3/2018 | Park | |
| 2018/0132208 | A1 * | 5/2018 | Pan | H04W 72/20 |
| 2018/0152953 | A1 | 5/2018 | Park et al. | |
| 2018/0199375 | A1 | 7/2018 | Nezou et al. | |
| 2018/0205441 | A1 * | 7/2018 | Asterjadhi | H04W 72/044 |
| 2018/0242355 | A1 | 8/2018 | Lou et al. | |
| 2018/0249483 | A1 * | 8/2018 | Chen | H04W 72/12 |
| 2018/0332539 | A1 * | 11/2018 | Fan | H04W 52/281 |
| 2019/0014505 | A1 * | 1/2019 | Kim | H04W 16/32 |
| 2019/0053215 | A1 * | 2/2019 | Yu | H04B 7/15542 |
| 2019/0082461 | A1 | 3/2019 | Guo et al. | |
| 2019/0089498 | A1 * | 3/2019 | Pelletier | H04L 5/005 |
| 2019/0132856 | A1 * | 5/2019 | Moon | H04W 72/23 |
| 2019/0150176 | A1 * | 5/2019 | Pelletier | H04W 72/566 370/329 |
| 2019/0159226 | A1 * | 5/2019 | Ly | H04W 72/23 |
| 2019/0174513 | A1 * | 6/2019 | Loehr | H04W 72/1268 |
| 2019/0215790 | A1 * | 7/2019 | Kim | H04L 5/0048 |
| 2019/0246414 | A1 | 8/2019 | Yang | |
| 2019/0313466 | A1 | 10/2019 | Ko et al. | |
| 2019/0320467 | A1 * | 10/2019 | Freda | H04L 5/0055 |
| 2019/0387546 | A1 * | 12/2019 | Li | H04L 27/26025 |
| 2020/0029324 | A1 | 1/2020 | Nezou et al. | |
| 2020/0037230 | A1 * | 1/2020 | Chen | H04J 11/0073 |
| 2020/0163127 | A1 * | 5/2020 | Chitrakar | H04L 27/26 |
| 2020/0280942 | A1 * | 9/2020 | Jung | H04J 11/0069 |
| 2021/0014791 | A1 * | 1/2021 | Freda | H04W 52/0229 |
| 2021/0168858 | A1 * | 6/2021 | Liu | H04L 27/26 |
| 2021/0289536 | A1 * | 9/2021 | Liu | H04L 27/2602 |

FOREIGN PATENT DOCUMENTS

| | | | | |
|---|---|---|---|---|
| RU | 2723083 C1 | 6/2020 | | |
| WO | WO 2017069349 A1 | 4/2017 | | |
| WO | WO-2018030710 A1 * | 2/2018 | H04W 72/0446 |
| WO | WO 2018031638 A1 | 2/2018 | | |
| WO | WO-2018129699 A1 * | 7/2018 | H04W 72/23 |
| WO | WO 2019220648 A1 | 11/2019 | | |

OTHER PUBLICATIONS

Hedayat et al., "CIDs for: Section 9.3.1.23 Random Access CIDs," IEEE 802.11-16/1516r1, Nov. 4, 2016. (4 pages).
International Search Report, mailed Mar. 6, 2018, for International Patent Application No. PCT/JP2017/043908. (3 pages) (with English Translation).
Khorov et al., "Random Access RU Allocation in the Trigger Frame," IEEE 802.11-16/0582r3, May 16, 2016. (24 pages).
Stacey et al., "Proposed TGax draft specification," IEEE 802.11-16/0024r1, Mar. 2, 2016. (160 pages).
Stacey et al., "Specification Framework for TGax," IEEE 802.11-15/0132r15, May 25, 2016. (61 pages).
Tian et al., "Remaining Topics in Power Control," IEEE 802.11-16/0617r1, May 16, 2016. (24 pages).

* cited by examiner

FIG. 3

Trigger Type

| Trigger Type value | Trigger Type description |
|---|---|
| 0 | Basic Trigger |
| 1 | Beamforming Report Poll Trigger |
| 2 | MU-BAR |
| 3 | MU-RTS |
| 4-TBD | Reserved |

FIG. 4

User Info

| | AID12 | RU Allocation | Coding Type | MCS | DCM | SS Allocation | Target RSSI | Trigger Dependent User Info |
|---|---|---|---|---|---|---|---|---|
| Bits: | 12 | 8 | 1 | 4 | 1 | 6 | TBD | Variable |

FIG. 14

| User Info | STA condition | RU Allocation | Coding Type | MCS | DCM | SS Allocation | Target RSSI | Reserved |
|---|---|---|---|---|---|---|---|---|
| Bits: | 4 | 8 | 1 | 4 | 1 | 6 | 7 | 1 |

FIG. 15

| ID | CONSTRAINT CONDITION |
| --- | --- |
| 0 | N/A |
| 1 | REQUESTED TRANSMISSION POWER ≥ MINIMUM POWER |
| 2 | REQUESTED TRANSMISSION POWER < MINIMUM POWER |
| 3 ~ 15 | reserved |

FIG. 16

| ID | CONSTRAINT CONDITION |
|---|---|
| 0 | N/A |
| 1 ~ 7 | reserved |
| 8 | REQUESTED TRANSMISSION POWER ≥ MINIMUM POWER |
| 9 | REQUESTED TRANSMISSION POWER < MINIMUM POWER |
| 10 ~ 15 | reserved |

COMMUNICATION APPARATUS, TERMINAL, AND COMMUNICATION METHOD

TECHNICAL FIELD

The present disclosure relates to a communication apparatus, a terminal, and a communication method.

BACKGROUND ART

The Task Group ax of IEEE (the Institute of Electrical and Electronics Engineers) 802.11 Working Group, formulation of a technical specification for IEEE 802.11ax (hereinafter referred to as "11ax") is underway as a next standard of 802.11ac. 11ax specifies incorporation of random access (RA: Random Access) based on OFDMA (Orthogonal frequency-division multiple access).

An access point (also called a "base station") transmits, to a plurality of terminals (which may be referred to as "STAs (stations)" accommodated by the access point, a control signal (hereinafter referred to as a "Trigger frame") soliciting transmission of uplink OFDMA signals.

For the Trigger frames, a Common Info field including information that is common to a plurality of terminals whose transmission signals are multiplexed using OFDMA and User Info fields including pieces of information that are unique to respective terminals whose transmission signals are multiplexed using OFDMA are defined (NPL 1 and NPL 4).

A Trigger Type subfield included in the Common Info field indicates a Trigger Type that is a type of Trigger frame (the type of signal that the access point causes the terminals to transmit) (NPL 2 and NPL 3).

An AID12 subfield included in each User Info field notifies an Association ID (AID), which is a unique ID allocated to a terminal during association. Setting AID=0, which is one of unused AIDs, to thereby indicate, to each terminal, that a frequency resource (RU: Resource Unit) indicated by an RU Allocation subfield in the User Info field is an RU for RA has been agreed upon in 11ax.

In addition, incorporating a new Trigger frame (hereinafter referred to as a "RA variant Trigger frame") that is dedicated to RA has been newly agreed upon at a meeting for 11ax (NPL 5). When the RA variant Trigger frame is applied, all RUs indicated by the User Info field are RUs for RA. A terminal randomly selects one RU from the indicated plurality of RUs for RA and transmits a UL response signal (which may also be referred to as a "UL (Uplink) response frame") by using the selected RU.

Also, when the RA variant Trigger frame is applied, it is not necessary to use the AID12 subfield in the User Info field to indicate that an RU indicated by the User Info field is an RU for RA, and thus the AID12 subfield becomes a redundant field.

CITATION LIST

Non Patent Literature

NPL 1: IEEE 802.11-15/0132r17 "Specification Framework for TGax"

NPL 2: IEEE 802.11-16/0024r1 "Proposed TGax draft specification"

NPL 3: IEEE 802.11-16/0806r0 "HE Variant HT Control-Buffer Status Report"

NPL 4: IEEE 802.11-16/0617r1 "Remaining Topics in Power Control"

NPL 5: IEEE 802.11-16/1516r1 "CIDs for: Section 9.3.1.23 Random Access CIDs"

SUMMARY OF INVENTION

Sufficient consideration has not been given to how to use the AID12 subfield, which becomes a redundant field, when the RA variant Trigger frame is applied.

One aspect of the present disclosure provides a communication apparatus, a terminal, and a communication method that can effectively utilize or reduce a redundant field in the Trigger frame.

A communication apparatus according to one aspect of the present disclosure comprises an AID generator that generates, based on trigger-type information indicating a type of trigger signal instructing transmission of an uplink signal, information to be set in a terminal ID field in the trigger signal; a trigger-signal generator that generates the trigger signal, based on the trigger-type information, and that sets the information, generated by the AID generator, in the terminal ID field; and a transmitter that transmits the trigger signal generated by the trigger-signal generator. When the trigger-type information indicates random-access transmission, the AID generator generates information that is different from a terminal ID.

A terminal according to one aspect of the present disclosure comprises: a receiver that transmits a trigger signal instructing transmission of an uplink signal; a determiner that determines, when trigger-type information indicating a type of trigger signal indicates random-access transmission, a resource unit for random access, based on information set in a terminal ID field in the trigger signal; and a generator that generates a random access signal by using the resource unit for random access, the resource unit being determined by the determiner.

These general or specific embodiments may be realized by a system, an apparatus, a method, an integrated circuit, a computer program or a recording medium or may be realized by an arbitrary combination of a system, an apparatus, a method, an integrated circuit, a computer program, and a recording medium.

According to one aspect of the present disclosure, it is possible to effectively utilize or reduce a redundant field.

Additional benefits and advantages of one aspect of the present disclosure will become apparent from the specification and drawings. The benefits and/or advantages may be individually obtained by some embodiments and features of the specification and drawings, which need not all be provided in order to obtain one or more of the same features.

BRIEF DESCRIPTION OF DRAWINGS

FIG. 3 is a table showing a Trigger Type in the normal Trigger frame according to the first embodiment.

FIG. 4 is a diagram showing the format of a User Info field in the normal Trigger frame according to the first embodiment.

FIG. 14 is a diagram showing the format of a User Info field in a RA variant Trigger frame according to a second embodiment.

FIG. 15 is a table showing one example (notification example 1) of constraint conditions according to the second embodiment.

FIG. 16 is a table showing one example (notification example 2) of the constraint conditions according to the second embodiment.

DESCRIPTION OF EMBODIMENTS

Individual embodiments in the present disclosure will be described below in detail with reference to the drawings. In each embodiment, the same constituent elements are denoted by the same reference numbers, and descriptions thereof are redundant and are thus omitted.

Also, in the following description, the Trigger frame already incorporated into 11ax is referred to as a "normal Trigger frame" in order to distinguish it from the RA variant Trigger frame. Also, the normal Trigger frame and the RA variant Trigger frame are collectively referred to as a "Trigger frame".

First Embodiment

[Normal Trigger Frame]

Figure 1:
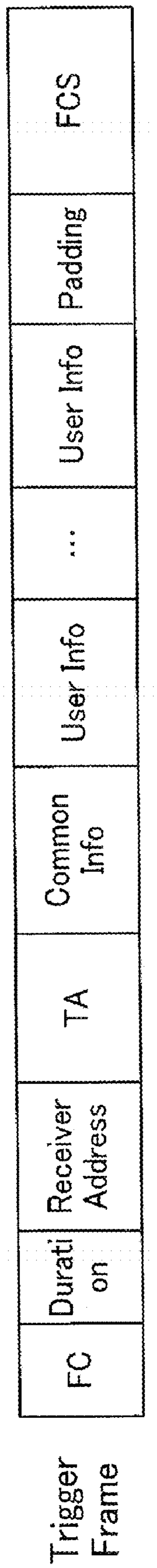
FIG. 1 is a diagram showing the format of a normal Trigger frame according to a first embodiment.

FIG. 1 is a diagram showing a format of the normal Trigger frame. In the normal Trigger frame, a Common Info field including information that is common to a plurality of terminals whose transmission signals are multiplexed using OFDMA and User Info fields including respective pieces of unique information of a plurality of terminals whose transmission signals are multiplexed using OFDMA are defined (NPL 1).

Figure 2:
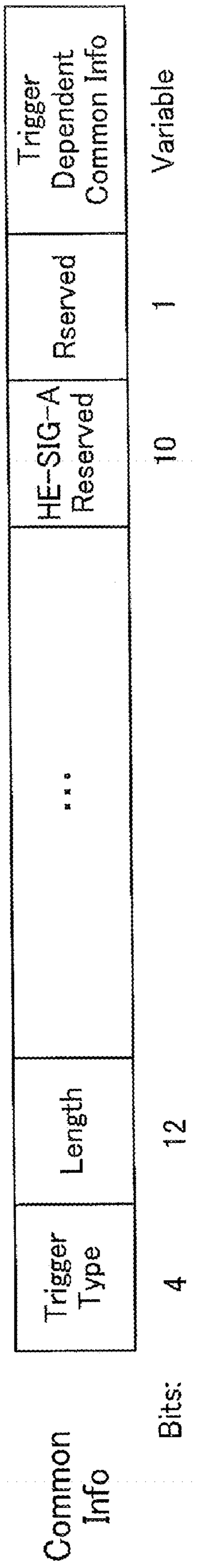
FIG. 2 is a diagram showing the format of a Common Info field in the normal Trigger frame according to the first embodiment.

FIG. 2 is a diagram showing a format of the Common Info field in the normal Trigger frame (NPL 1). A Trigger Type subfield indicates a Trigger Type. Types shown in FIG. 3 are defined as the Trigger Type (NPL 2). Study is also being conducted on adding a Trigger Type indicating reporting of transmission buffer information of terminals (this Trigger Type is hereinafter referred to as a Buffer Status Report Poll (BSRP)), in addition to the definition in FIG. 3 (NPL 3). A Trigger Dependent Common Info subfield can include terminal common information that suits the Trigger type.

FIG. 4 is a diagram showing a format of the User Info field in the normal Trigger frame (NPL 1 and NPL 4). FIG. 4 is a format in which the size of a Target RSSI subfield, which is undefined in NPL 1, is reflected into 7 bits in accordance with a proposal in NPL 4. The AID12 subfield gives a notification of an AID. Setting AID=0 indicates that an RU indicated in the User Info field is an RU for RA (NPL 1). Also, a Trigger Dependent User Info subfield can include terminal-specific information that suits the Trigger type.

[RA Variant Trigger Frame]

As described above, incorporation of the RA variant Trigger frame, the frame being dedicated to RA, was newly agreed upon at a meeting for 11ax (NPL 5).

In the normal Trigger frame (FIG. 1), a plurality of User Info fields is set depending on the number of terminals multiplexed using OFDMA. On the other hand, in the RA variant Trigger frame, only one User Info field is set. Other fields in the RA variant Trigger frame are the same as the fields in FIG. 1.

In the format of the Common Info field in the RA variant Trigger frame, the Trigger Dependent Common Info subfield is deleted from the format shown in FIG. 2. Other fields in the Common Info field in the RA variant Trigger frame are the same as the fields in FIG. 2.

Also, in order to apply the RA variant Trigger frame, it is conceivable to add a new Trigger Type (hereinafter referred to as an "RA trigger") indicating RA transmission to a Reserved in the Trigger Type subfield in FIG. 3.

Figure 5:
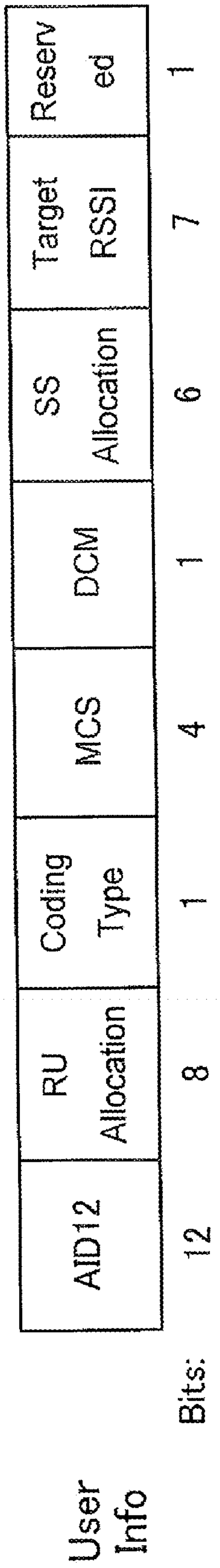
FIG. 5 is a diagram showing the format of a User Info field in a RA variant Trigger frame according to the first embodiment.

FIG. 5 is a diagram showing the format of the User Info field in the RA variant Trigger frame (NPL 5). As shown in FIG. 5, in the format of each User Info field in the RA variant Trigger frame, a Trigger Dependent Per User Info subfield is deleted.

Figure 6:
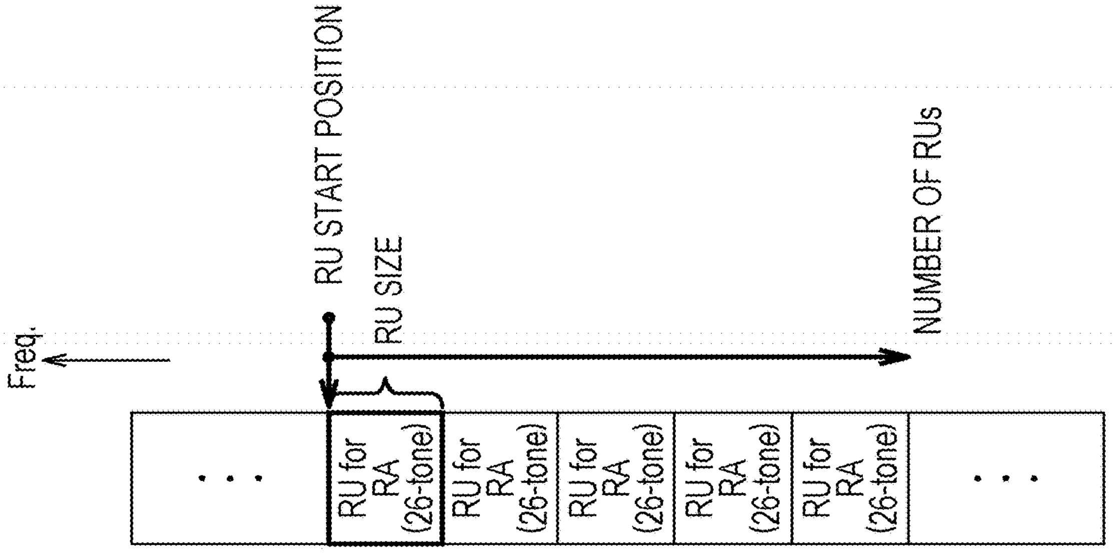
FIG. 6 is a diagram showing one example of RUs for RA which are specified by the RA variant Trigger frame according to the first embodiment.

When the RA variant Trigger frame is applied, all RUs that are notified by an RU Allocation subfield in the User Info field are RUs for RA (RUs for RA), as shown in FIG. 6. Also, in the RA variant Trigger frame, the arrangement of RUs for RA is limited to one contiguous band in order to reduce the size of the Trigger frame. The sizes of all RUs for RA are assumed to be the same.

Thus, the RU Allocation subfield indicates the start position of the RUs for RA, the RUs being a contiguous band, and the size of the RUs for RA. Also, when the RA variant Trigger frame is applied, an SS Allocation subfield limits the number of spatial multiplexing streams during transmission of RUs for RA to 1 to thereby indicate the number of RUs for RA, instead of indicating the number of spatial multiplexing streams. Also, information set in Coding Type, MCS, DCM, and Target RSSI subfields are assumed to be common to a plurality of RUs for RA.

As described above, in the RA variant Trigger frame, functions are limited, and one User info field indicates a plurality of contiguous RUs for RA, thereby making it possible to reduce the size of the Trigger frame.

Also, the Trigger Dependent Common Info subfield in the Common Info field and the Trigger Dependent Per User Info subfield in the User Info field are deleted from the RA variant Trigger frame to thereby make it possible to further reduce the size of the Trigger frame.

Also, when the RA variant Trigger frame is applied, the AID12 subfield in the User Info field does not need to indicate that the frequency resource is an RU for RA, and thus the AID12 subfield becomes a redundant field. The inventors have paid attention to this point and have made this disclosure.

[Major Configuration of Access Point and Terminal]

A wireless communication system according to the present embodiment is provided with an access point (a wireless transmitting apparatus) 100 and a terminal (a wireless receiving apparatus) 200. The access point 100 transmits the Trigger frame indicating RA transmission to the terminal 200, the terminal 200 receives the Trigger frame and transmits RA to the access point 100 by using a resource indicated by the Trigger frame.

Figure 7:
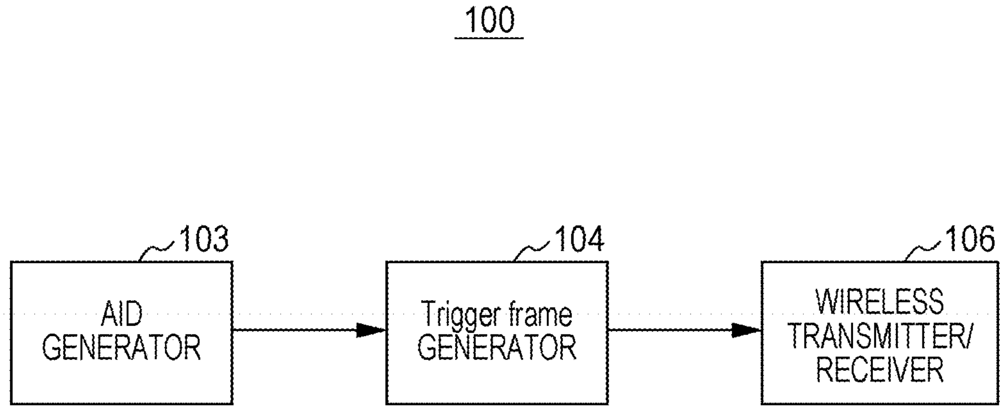
FIG. 7 is a block diagram showing a major configuration of an access point according to the first embodiment.

FIG. 7 is a block diagram showing a major configuration of the access point 100 according to the present embodiment. In the access point 100 shown in FIG. 7, when the Trigger Type is the RA trigger, an AID generator 103 generates information that is different from an AID as information for the AID12 subfield. When the Trigger Type is the RA trigger, a Trigger frame generator 104 generates a RA variant Trigger frame and sets, in the AID12 subfield, the information output from the AID generator 103. A wireless transmitter/receiver 106 transmits the Trigger frame, generated by the Trigger frame generator 104, to the terminal 200.

Figure 8:
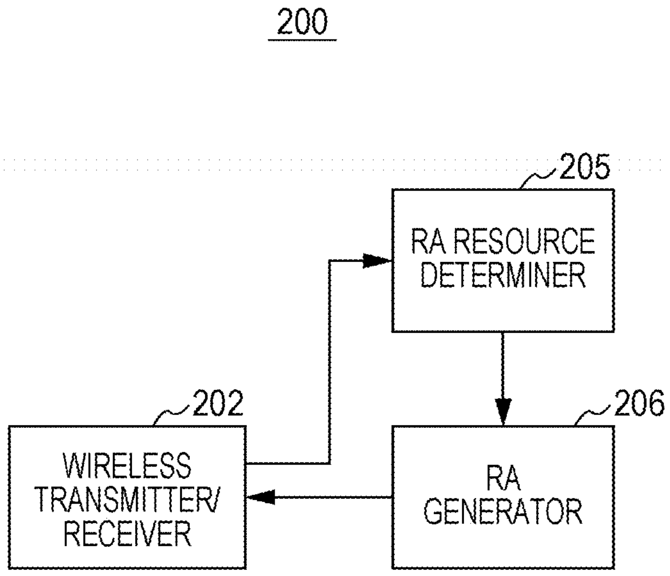
FIG. 8 is a block diagram showing a major configuration of a terminal according to the first embodiment.

FIG. 8 is a block diagram showing a major configuration of the terminal 200 according to the present embodiment. In the terminal 200 shown in FIG. 8, a wireless transmitter/receiver 202 receives the Trigger frame transmitted from the access point 100. When the Trigger Type is the RA trigger, an RA resource determiner 205 identifies, in a contiguous band indicated by the information in the RU Allocation subfield and the information in the SS Allocation subfield, a plurality of RUs for RA that can be allocated according to the information in the AID12 field and randomly selects one of the RUs to determine an RU for RA. The RA generator 206 generates an RA signal by using the RU for RA which was determined by the RA resource determiner 205. The wireless transmitter/receiver 202 transmits the RA signal, generated by the RA resource determiner 205, to the access point 100.

[Configuration of Access Point]

Figure 9:
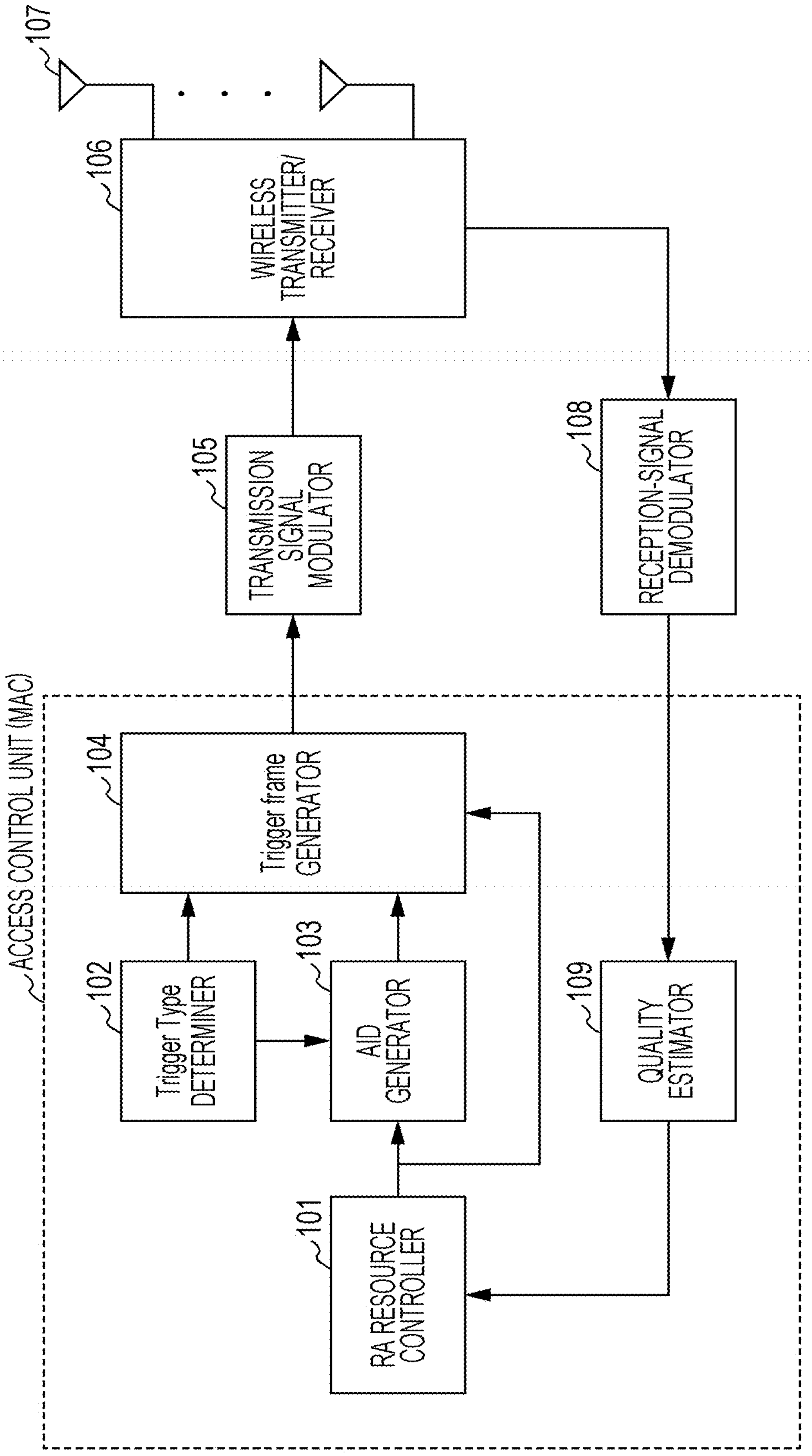
FIG. 9 is a block diagram showing the configuration of the access point according to the first embodiment.

FIG. 9 is a block diagram showing the configuration of the access point 100 according to the present embodiment. In FIG. 9, the access point 100 has an RA-resource controller 101, a Trigger Type determiner 102, an AID generator 103, a Trigger frame generator 104, a transmission-signal modulator 105, a wireless transmitter/receiver 106, an antenna 107, a reception-signal demodulator 108, and a quality estimator 109. The wireless transmitter/receiver 106 incudes a transmitter and a receiver. Also, the RA-resource controller 101, the Trigger Type determiner 102, the AID generator 103, the Trigger frame generator 104, and the quality estimator 109 constitute an access control (MAC: Media Access Control) unit.

The RA-resource controller 101 determines a band to which an RU for RA is to be allocated in a system band, based on reception qualities of respective predetermined-size RUs, the reception qualities being output from the quality estimator 109. For example, when there is an RU having low reception quality, such as an RU that overlaps a band used by another service, an RU corresponding to a DC frequency in a baseband during demodulation, or an RU having relatively strong interference, the RA-resource controller 101 allocates an RU for RA in a non-contiguous band in order to avoid allocation to that RU. Further, the RA-resource controller 101 outputs, to the AID generator 103 and the Trigger frame generator 104, RU-for-RA allocation information indicating a band to which the RUs for RA are to be allocated.

The Trigger Type determiner 102 determines a Trigger Type (trigger-type information) of the Trigger frame. The Trigger Type determined by the Trigger Type determiner 102 includes an RA trigger to which the RA variant Trigger frame is applied. Further, the Trigger Type determiner 102 outputs the Trigger Type subfield information indicating the Trigger Type to the AID generator 103 and the Trigger frame generator 104.

The AID generator 103 generates information for the AID12 subfield (information to be set in a terminal ID field) in the Trigger frame, based on the RU-for-RA allocation information output from the RA-resource controller 101 and the Trigger Type subfield information output from the Trigger Type determiner 102. In particular, the AID generator 103 generates information AID=0, when RA transmission is to be indicated to the terminal 200, and the Trigger Type is a type other than the RA trigger. In this case, one RU for RA is set in each User Info field. When a plurality of RUs for RA is to be set, a plurality of User Info fields needs to be provided in the Trigger frame.

Also, when the Trigger Type is the RA trigger (indicating random access transmission), the AID generator 103 generates information (information regarding allocation of RUs for RA) different from the AID as the information for the AID12 subfield. Details (a specific example) of the operation of the AID generator 103 in this case are described later.

Further, the AID generator 103 outputs the generated information to the Trigger frame generator 104.

When the Trigger Type is a type other than the RA trigger, the Trigger frame generator (a trigger-signal generator) 104 generates a normal Trigger frame. On the other hand, when the Trigger Type is the RA trigger, the Trigger frame generator 104 generates a RA variant Trigger frame.

Also, the Trigger frame generator 104 sets the information, output from the AID generator 103, in the AID12 subfield (the terminal ID field) in the Trigger frame.

Also, upon generating the RA variant Trigger frame, the Trigger frame generator 104 sets, in the RU Allocation subfield, the position of a start RU of RUs for RA, the RUs being a contiguous band, and an RU size, based on the RU-for-RA allocation information output from the RA-resource controller 101, and sets, in the SS Allocation subfield, the number of continuous RUs of the RUs for RA.

Further, the Trigger frame generator 104 outputs the generated Trigger frame (a trigger signal) to the transmission-signal modulator 105.

The transmission-signal modulator 105 performs encoding/modulation processing on the Trigger frame output from the Trigger frame generator 104. Further, the transmission-signal modulator 105 adds a control signal (which is also called a preamble), such as a pilot signal used for frequency synchronization and timing synchronization at the receiving end (the terminal 200) and a signal for channel estimation, to a modulated signal to generate a wireless frame (a transmission signal) and outputs the wireless frame to the wireless transmitter/receiver 106.

The wireless transmitter/receiver 106 performs predetermined wireless transmission processing, such as D/A conversion and up-conversion into a carrier frequency, on the wireless frame (the transmission signal) output from the transmission-signal modulator 105 and transmits, to the terminal 200 via the antenna 107, the signal on which the wireless transmission processing was performed. Also, the wireless transmitter/receiver 106 receives the signal, transmitted from the terminal 200, via the antenna 107, performs predetermined wireless reception processing, such as down-conversion into the baseband and A/D conversion, on the received signal, and outputs, to the reception-signal demodulator 108, the signal on which the wireless reception processing was performed.

The reception-signal demodulator 108 performs autocorrelation processing or the like on the signal, output from the wireless transmitter/receiver 106, to thereby extract the wireless frame and outputs the wireless frame to the quality estimator 109.

The quality estimator 109 estimates a reception quality for each predetermined-size RU by using the pilot signal included in the wireless frame output from the reception-signal demodulator 108 and outputs an estimation result to the RA-resource controller 101.

[Configuration of Terminal]

Figure 10:
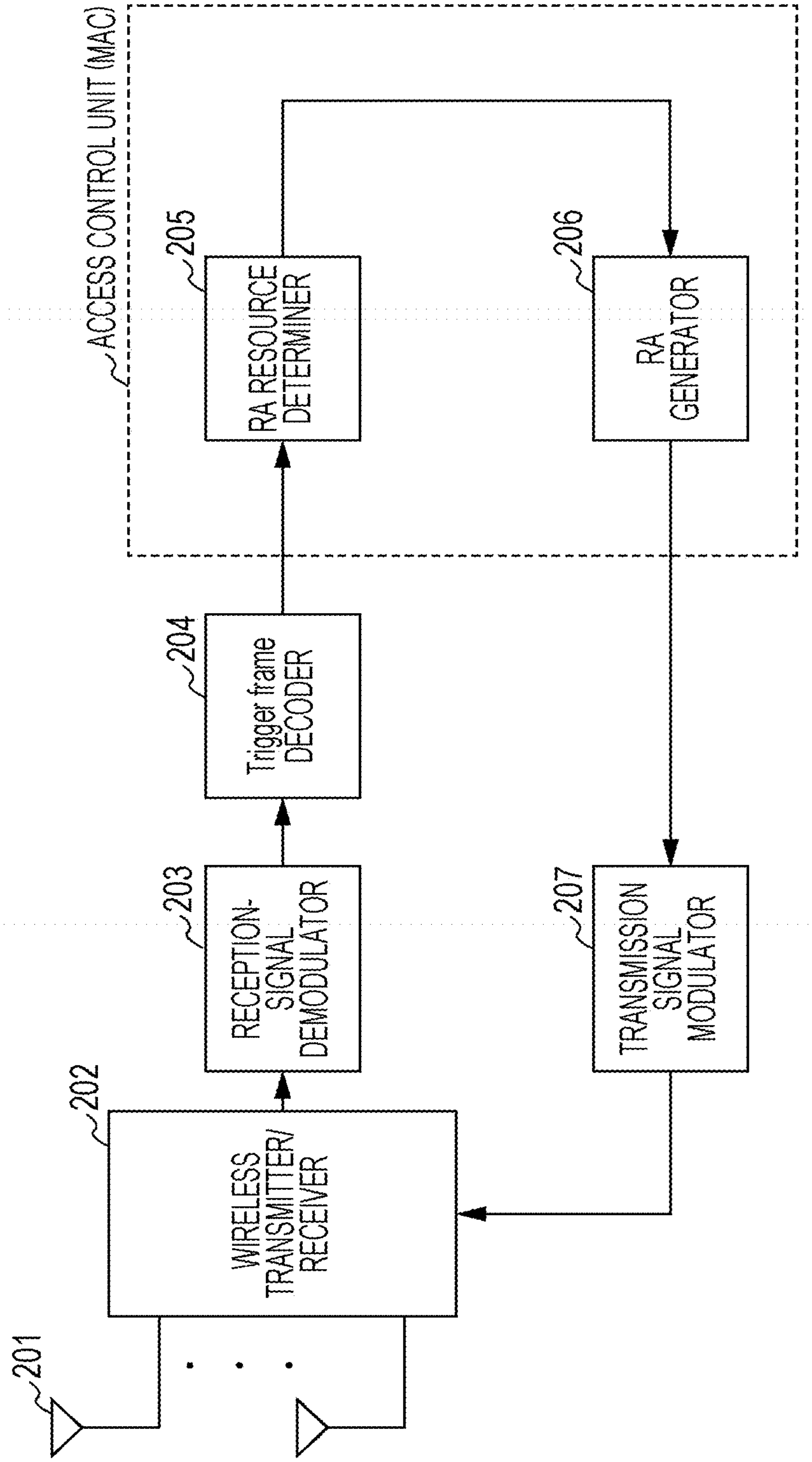
FIG. 10 is a block diagram showing the configuration of the terminal according to the first embodiment.

FIG. 10 is a block diagram showing the configuration of the terminal 200 according to the present embodiment. In FIG. 10, the terminal 200 has an antenna 201, the wireless transmitter/receiver 202, a reception-signal demodulator 203, a Trigger frame decoder 204, the RA resource determiner 205, the RA generator 206, and a transmission-signal modulator 207. The wireless transmitter/receiver 202 includes a transmitter and a receiver. Also, the RA resource determiner 205 and the RA generator 206 constitute an access controller (MAC).

The wireless transmitter/receiver 202 receives the Trigger frame, transmitted from the access point 100, via the antenna 201, performs predetermined wireless reception processing, such as down-conversion into the baseband and A/D conversion, on the received signal, and outputs, to the reception-signal demodulator 203, the signal on which the wireless reception processing was performed. Also, the wireless transmitter/receiver 202 performs predetermined wireless transmission processing, such as D/A conversion and up-conversion into the carrier frequency, on the signal output from the transmission-signal modulator 207, and transmits, to the access point 100 via the antenna 201, the signal on which the wireless transmission processing was performed.

The reception-signal demodulator 203 performs autocorrelation processing or the like on the signal, output from the wireless transmitter/receiver 202, to thereby extract the wireless frame (the Trigger frame) and outputs the wireless frame to the Trigger frame decoder 204.

The Trigger frame decoder 204 decodes the Trigger frame output from the reception-signal demodulator 203 and outputs the decoded Trigger frame to the RA resource determiner 205.

The RA resource determiner 205 determines an RU for RA, based on the information in the Trigger Type field, the AID12 field, the RU Allocation subfield, and the SS Allocation subfield in the Trigger frame output from the Trigger frame decoder 204. Specifically, when the Trigger Type is the RA trigger (the RA variant Trigger frame), the RA resource determiner 205 identifies, in the contiguous band indicated by the information in the RU Allocation subfield and the information in the SS Allocation subfield, a plurality of RUs for RA that can be allocated in accordance with the information in the AID12 field and randomly selects one of the RUs for RA to determine an RU for RA. Also, when the Trigger Type is a frame (the normal Trigger frame) other than the RA trigger, and when the AID is 0, the RA resource determiner 205 determines, as an RU for RA, one RU set in the RU Allocation subfield in the User Info field.

The RA generator 206 generates an RA signal including a terminal ID and transmission information (such as data and control information) of the terminal by using the RU for RA which was determined by the RA resource determiner 205 and outputs the RA signal to the transmission-signal modulator 207.

The transmission-signal modulator 207 performs encoding/modulation on the RA signal. Further, the transmission-signal modulator 207 adds a control signal (a preamble), such as a pilot signal used for frequency synchronization and timing synchronization at the access point 100 and a signal for channel estimation, to the modulated signal to generate a wireless frame (a transmission signal) and outputs the wireless frame to the wireless transmitter/receiver 202. The RA signal is frequency-mapped on the RU for RA which is indicated by the information determined by the RA resource determiner 205.

[Operation of AID Generator]

Next, a detailed description will be given of the operation of the AID generator 103 in the present embodiment when the Trigger Type is the RA trigger. In the present embodiment, when the Trigger type is the RA trigger, the AID12 subfield is used as part of the information regarding allocation of RUs for RA. The following description will be given of three specific examples 1-1 to 1-3 of the AID12-subfield generation method executed by the AID generator 103.

Specific Example 1-1

Figure 11:
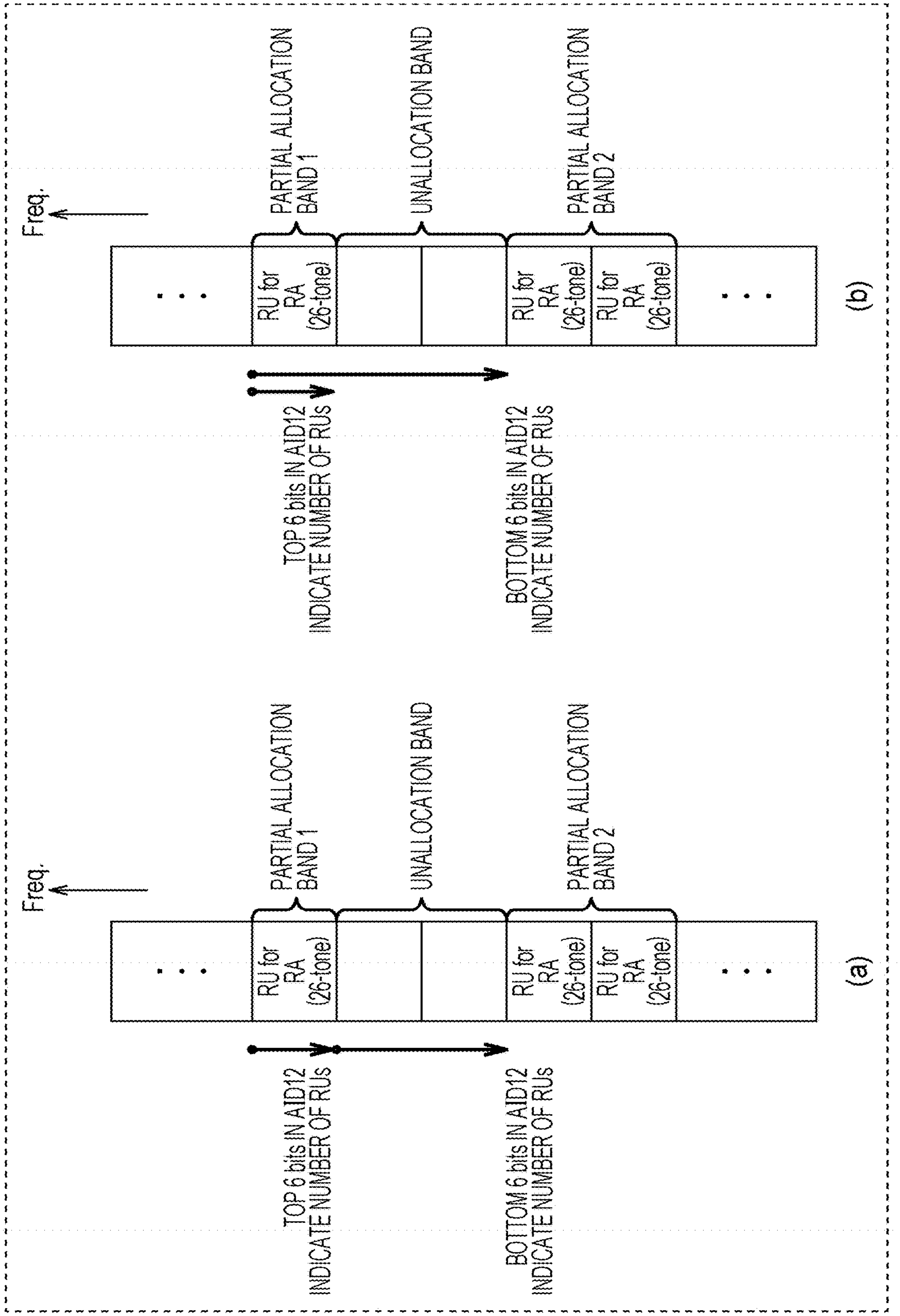
FIG. 11 is a diagram showing one example (specific example 1-1) of RUs for RA specified by the RA variant Trigger frame according to the first embodiment.

In specific example 1-1, the AID generator 103 sets the number of RUs in a partial allocation band 1 (a first block in a contiguous band) by using top 6 bits in the AID12 subfield and sets the number of RUs in an unallocation band by using bottom 6 bits in the AID12 subfield, as shown in FIG. 11(*a*), or sets the number of RUs in the partial allocation band 1 by using the top 6 bits in the AID12 subfield and sets the number of RUs up to the front-end RU of a partial allocation band 2 by using the bottom 6 bits in the AID12 subfield, as shown in FIG. 11(*b*). The information notified by the top 6 bits and the information notified by the bottom 6 bits may be interchanged therebetween.

In this case, the number of RUs set by the top/bottom 6 bits in the AID12 subfield is assumed to be a repeated number of an RU which is the same RU size notified by the RU allocation, as in the SS allocation (6 bits) in the RA variant Trigger frame. However, a notification of the number of RUs=0 is included. When the number of RUs that are not allocated or the number of RUs up to the partial allocation band 2 is set to “0”, it is possible to indicate RUs for RA in a contiguous band in the same manner as the RA variant Trigger frame.

As described above, in specific example 1-1, one User Info field can indicate RUs for RA in two bands. This can exclude allocation to an RU having a low reception quality and can improve performance. Also, using a definition that is similar to that of the SS allocation in the RA variant Trigger frame makes it possible to easily realize an implementation.

Specific Example 1-2

Figure 12:
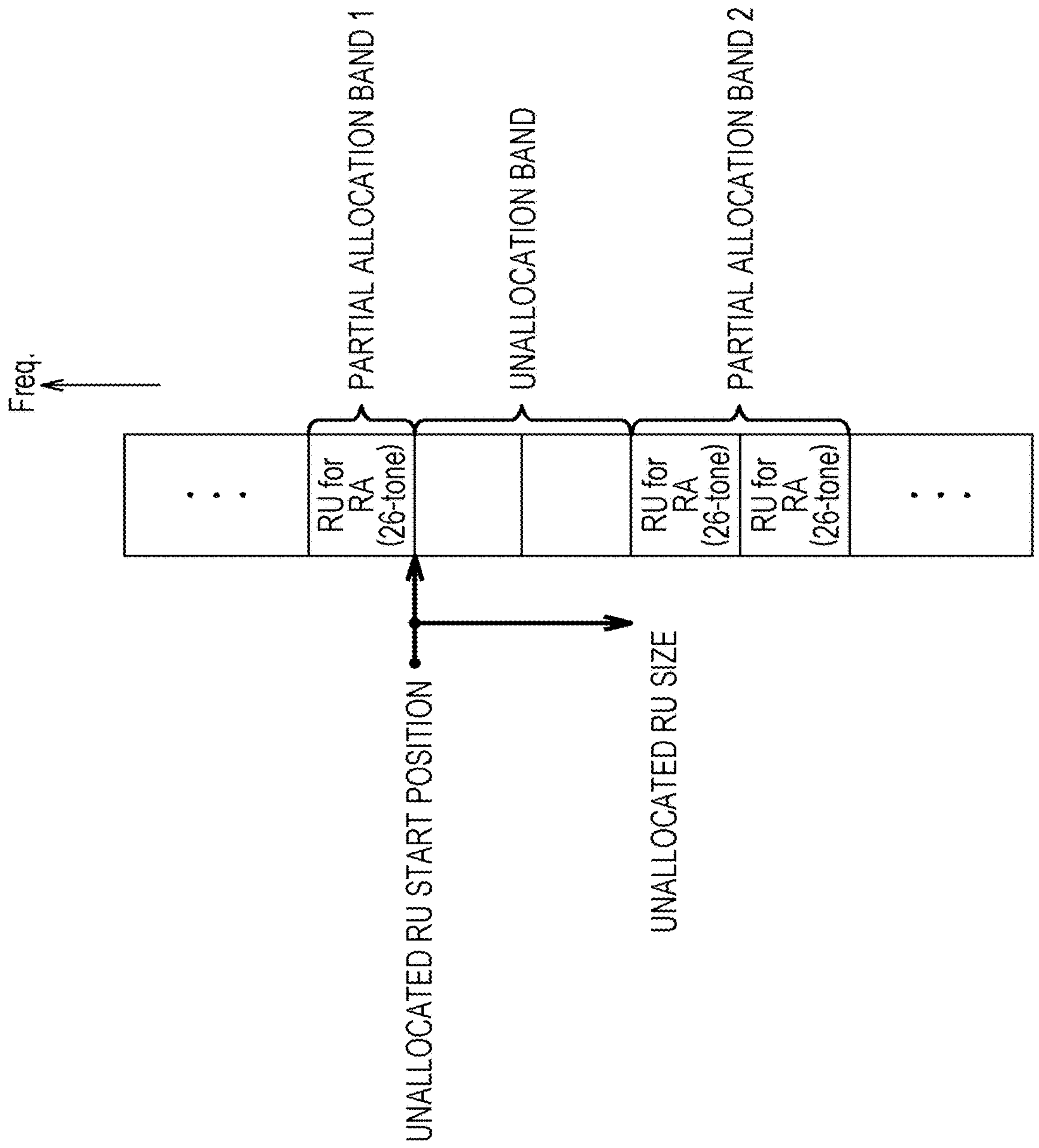
FIG. 12 is a diagram showing one example (specific example 1-2) of the RUs for RA specified by the RA variant Trigger frame according to the first embodiment.

In specific example 1-2, during contiguous-band allocation, the AID generator 103 sets an MSB in the AID12 subfield to “0” and sets the remaining 11 bits to “unused”. Also, during non-contiguous-band allocation, the AID generator 103 sets the MSB in the AID12 subfield to “1” and uses the remaining 11 bits for an RU allocation (8 btis) to indicate the start position and the size of unallocated RUs, as shown in FIG. 12.

In this manner, in specific example 1-2, one User Info field can indicate RUs for RA in two bands. This can exclude allocation to an RU having a low reception quality and can improve performance. Also, applying a definition that is similar to the definition of the RU allocation in the Trigger frame makes it possible to easily realize an implementation.

Specific Example 1-3

Figure 13:
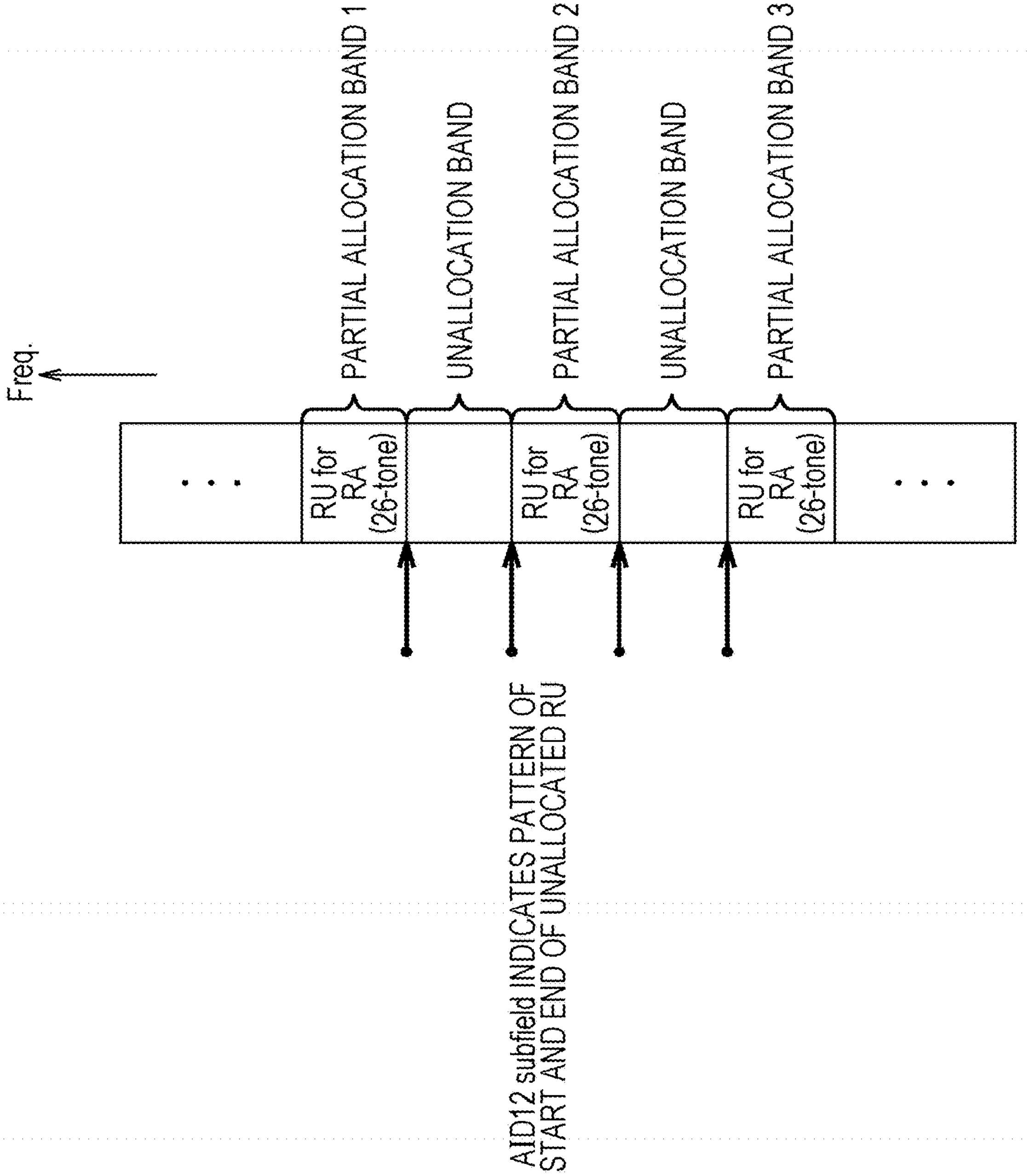
FIG. 13 is a diagram showing one example (specific example 1-3) of the RUs for RA specified by the RA variant Trigger frame according to the first embodiment.

In specific example 1-3, during non-contiguous-band allocation, the AID generator 103 sets “1” for the MSB in the AID12 subfield and sets pattern information about the start and the end of unallocated RUs by using the remaining 11 bits, as shown in FIG. 13. During contiguous-band allocation, the MSB in the AID12 subfield is set to "0", and, remaining 11 bits are set to unused.

The pattern of the unallocated RUs is changed according to the RU size. Specifically, when the RU size is 26 tones, the maximum number of RUs that can be notified as unallocated RUs is "35". "35" is a value obtained by subtracting "2", which is the minimum number of allocated RUs in two partial allocation bands, from "37", which is the number of RU allocation patterns for 80 MHz and 26-tones. Hence, the start of one unallocated RU and the number of RUs can be indicated by 10 bits in accordance with equation (1) below.

[Equation 1]

$$\lceil \log_2({}_{35+1}C_2) \rceil = 10[\text{bit}] \quad (1)$$

Also, when the RU size is 52 tones, the maximum number of RUs that can be notified as unallocated RUs is "14". "14" is a number obtained by subtracting "2", which is the minimum number of allocation RUs in two partial allocation bands, from "16", which is the number of RU allocation patterns for 80 MHz and 52-tones. Hence, the start of two unallocated RUs and the number of RUs can be indicated by 11 bits by using equation (2) below.

[Equation 2]

$$\lceil \log_2({}_{14+1}C_4) \rceil = 11[\text{bit}] \quad (2)$$

As described above, in specific example 1-3, one User Info field can indicate RUs for RA up to three bands. This can exclude allocation to an RU having a low reception quality and can improve the performance. Also, applying a definition that is similar to that of the RU allocation in the Trigger frame makes it possible to easily realize an implementation.

The definition may also be that the information indicated by the above-noted equations is about RU positions before and after a non-transmission band, not the start of RUs and the number of RUs.

As described above, according to the present embodiment, when the Trigger type is the RA trigger, the AID12 subfield is used as part of information regarding allocation of RUs for RA. This makes it possible to effectively utilize the AID12 subfield and makes it possible to enhance the functions (such as scheduling performance) without increasing the size of the Trigger frame. Specifically, it is possible to improve the degree of freedom of frequency scheduling for RA, and it is possible to obtain an advantage of an improvement in the performance of interference control.

In the present embodiment, part of the AID12 subfield may give a notification indicating that the frame is a RA variant Trigger frame which is dedicated to the Buffer Status Report Poll (BSRP) (for example, LSB=0: there is no limitation on transmission information, and LSB=1: only BSRP can be transmitted).

The above description has been given of the first embodiment.

Second Embodiment

When the RA variant Trigger frame is applied, treating terminals in various conditions in the same way can lead to deterioration of performance. For example, when variations in the distance are large, and control of signal electric power is not sufficient, the performance deteriorates owing to multi-user interference. Transmission power control is applied to an uplink OFDMA signal indicated by the Trigger frame (NPL 4). For example, terminals that can change the transmission power in only a few stages and terminals that do not have the function of transmission power control exist in terminals that support 11ax, and thus, the accuracy of the transmission power control differs depending on the terminal. Hence, there is a possibility that each terminal cannot transmit signals with transmission power that satisfies the Target RSSI, because of restrictions on the maximum transmission power and the minimum transmission power of each terminal, even though the terminal calculates the transmission power based on the Target RSSI or the like indicated by a notification from an access point. In this case, there is a possibility that inter-multiuser interference due to a difference in the reception electric power of signals between terminals occurs, and the reception performance deteriorates.

In view of these points, in the second embodiment, a description will be given of a case in which RA performance deterioration due to inter-multiuser interference is reduced by reducing the size of the Trigger frame (the AID12 subfield) by a unit of an octet (8 bits) and reading bits that are a fraction thereof instead as constraint information for the terminal to which the Trigger frame is to be transmitted.

[Configuration of Access Point]

The configuration of an access point according to the present embodiment is the same as the configuration of the access point 100 in the first embodiment shown in FIG. 9. However, compared with the access point 100 described in the first embodiment, the access point according to the present embodiment differs in the operation of the RA-resource controller 101 and the operation of the AID generator 103 when the Trigger Type is the RA trigger.

The RA-resource controller 101 determines a constraint method for the terminal 200, based on a reception quality for each predetermined-size RU output from the quality estimator 109. For example, the RA-resource controller 101 achieves an improvement in the reception performance by not imposing a constraint on RA transmission of the terminal 200 when the reception quality is higher than a predetermined threshold and by imposing a constraint on the RA transmission of the terminal 200 when the reception quality is lower than the predetermined threshold. Further, the RA-resource controller 101 outputs, to the AID generator 103 and the Trigger frame generator 104, terminal constraint information indicating the determined constraint method for the terminal 200.

When the Trigger Type is the RA trigger, the AID generator 103 reduces 1 octet (8 bits) of 12 bits in the AID12 subfield and generates, for the remaining 4 bits, information (constraint information for the terminal) different from the AID information. Details (a specific example) of the operation of the AID generator 103 in this case is described later.

[Configuration of Terminal]

The configuration of a terminal according to the present embodiment is the same as the configuration of the terminal 200 in the first embodiment shown in FIG. 10. However, compared with the terminal 200 described in the first embodiment, the terminal according to the present embodiment differs in the operation of the RA resource determiner 205 when the Trigger Type is the RA trigger.

When the Trigger Type is the RA trigger (the RA variant Trigger frame), the RA resource determiner 205 identifies, from the information in the RU Allocation subfield and the SS Allocation subfield, a plurality of RUs for RA and further decides whether or not the local terminal can perform RA transmission, based on information regarding constraint condition for the terminal, the information being included in the AID12. Details of the constraint condition are described later. Upon deciding that the local terminal can perform RA transmission, the RA resource determiner 205 randomly selects one of the identified plurality of RUs for RA to determination an RU for RA. On the other hand, upon deciding that the local terminal cannot perform RA transmission, the RA resource determiner 205 determines that there is no RU for RA.

[Operation of AID Generator]

Next, a detailed description will be given of the operation of the AID generator 103 in the present embodiment when the Trigger Type is the RA trigger. In the present embodiment, the AID generator 103 reduces the size of the Trigger frame, and bits that are a fraction of a unit of an octet are read instead as constraint information for the terminal 200 to which the RA variant Trigger frame is to be transmitted. The following description will be given of two specific examples 2-1 to 2-2 of a method in which the AID generator 103 generates the remaining 4 bits in the AID12 subfield.

Specific Example 2-1

In specific example 2-1, the AID generator 103 reduces 1 octet (8 bits) of 12 bits in the AID12 subfield and uses the remaining 4 bits as information for Reserved information, as shown in FIG. 14. Also, although the notation in FIG. 14 is AID12, it may be a different notation, such as AID4 or Reserved. Also, the already provided last Reserved subfield and the remaining 4 bits in the User Info field may together constitute one Reserved subfield of 5 bits.

This makes it possible to reduce the redundant field in the Trigger frame by 1 octet (8 bits) and makes it possible to reduce control signal overhead due to the transmission of the Trigger frame. Also, increasing the size of the Reserved subfield makes it possible to increase an unused region and makes it easier to support future specification changes.

Specific Example 2-2

In specific example 2-2, the AID generator 103 reduces 1 octet (8 bits) of 12 bits in the AID12 subfield, and the remaining 4 bits indicate constraint information for the terminal, as shown in FIG. 14. Although the notation in FIG. 14 is AID12, it may be a different notation, such as AID4 or constraint information. The constraint information is information in which an ID and a constraint condition are mapped. The constraint condition is, for example, a condition that whether or not transmission power (hereinafter referred to as "requested transmission power") required to satisfy the Target RSSI indicated by a notification from the access point is larger than or equal to the minimum transmission power of the terminal. The condition that the minimum transmission power of the terminal is larger than or equal to the requested transmission power is a condition that reception electric power at the access point side is larger than the Target RSSI, that is, a condition that inter-user interference can occur easily. The terminal reads the constraint condition of the terminal by using an ID transmitted with 4 bits in the AID12 subfield, calculates the requested transmission power, and then decides whether or not the requested transmission power satisfies the constraint condition. The terminal performs RA transmission when the requested transmission power satisfies the constraint condition and does not perform RA transmission when the requested transmission power does not satisfy the constraint condition.

Notification examples 1 and 2 using 4 bits will be described below.

Notification Example 1

In notification example 1, 4 bits in the AID12 subfield and the constraint condition are allocated as in FIG. 15. Sequential allocation from "0" makes it easier to perform processing for determining the constraint condition of a terminal.

Also, an AID indicating the constraint information may similarly be added to an AID12 subfield for a Trigger Type (the normal Trigger frame) other than the RA trigger. For example, of AIDs after 2008 that has not been conventionally used, 2017 and 2018 in which the bottom 4 bits indicate "1" and "2" are used as the constraint information for RA.

Thus, when the Trigger Type is a type other than the RA trigger, processing for determining the constraint information can be simplified by combining the bottom bits of an AID that is highly likely to be used as the constraint information and the AID12 subfield used as the constraint information in the RA variant Trigger frame.

Notification Example 2

In notification example 2, 4 bits in the AID12 subfield and the constraint condition are allocated as in FIG. 16. "8" and "9" are bottom 4 bits of numbers (2008, 2009) that have been unused in the conventional AIDs. When the Trigger type is a type other than the RA trigger, the possibility that an unused AID is used during notification of constraint information that is similar to the above-described constraint information. Thus, when the Trigger type is a type other than the RA trigger, processing for determining the constraint information can be simplified by combining the bottom bits of an AID that is highly likely to be used as the constraint information and the AID12 subfield used as the constraint information in the RA variant Trigger frame.

As described above, according to the present embodiment, it is possible to reduce the redundant field in the Trigger frame by 1 octet (8 bits), and it is possible to reduce control-signal overhead due to the transmission of the Trigger frame. Also, limiting terminals that can perform RA transmission depending on whether or not the constraint condition notified by 4 bits in the AID12 subfield is satisfied makes it possible to reduce inter-user interference during RA reception at the access point.

A part of the 4 bits of the constraint information may give a notification indicating that the frame is the RA variant Trigger frame which is dedicated to Buffer Status Report Poll (BSRP). For example, it is assumed that, when 1 bit of 4 bits is allocated, and the 1 bit is "0", there is no limitation on transmission information on which the terminal performs RA transmission, and when the 1 bit is "1", the terminal limits the transmission information to BSRP to perform RA transmission.

The above description has been given of the second embodiment.

The first embodiment and the second embodiment may be used in combination. For example, a part (for example, 8 bits) of the bits in the AID12 subfield may be used as information regarding allocation of RUs for RA, and the remaining bits (for example, 4 bits) may be used as the constraint information for a terminal.

Also, the contiguous/non-contiguous bands used in each embodiment described above may mean that physical frequency resources are contiguous/non-contiguous or may mean that RU indices allocated to respective system bands and RU types are contiguous/non-contiguous.

Other Embodiments

Although a configuration in which one RA trigger is added as the Trigger type has been described in each embodiment described above, the present disclosure is not limited thereto, and a plurality of RA triggers, such as Basic RA triggers that cause normal data to be transmitted with the RA variant Trigger frame and BSRP RA Triggers that cause a transmission buffer state to be transmitted with the RA variant Trigger frame, may also be defined.

Also, although, in the embodiments described above, the description has been given in conjunction with an example in which one aspect of the present disclosure is configured using hardware, the present disclosure can also be realized by software in cooperation with hardware.

Also, the individual functional blocks used in the description of the above embodiments are typically realized as an LSI, which is an integrated circuit. The integrated circuit may control the individual functional blocks used in the description of the above embodiments and may have an input and an output. These may be individually realized by single chips or may be realized by a single chip so as to include some or all of the functional blocks. Although the functional blocks are implemented by an LSI in this case, they may also be called an IC, a system LSI, a super LSI, or an ultra LSI depending on a difference in the degree of integration.

The scheme for integrating the functional blocks into an integrated circuit is not limited to a scheme for LSI and may be realized using a dedicated circuit or a general-purpose processor. The scheme for the integration may also utilize an FPGA (Field Programmable Gate Array) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. Application of biotechnology or the like is possible.

A communication apparatus in the present disclosure comprises: an AID generator that generates, based on trigger-type information indicating a type of trigger signal instructing transmission of an uplink signal, information to be set in a terminal ID field in the trigger signal; a trigger-signal generator that generates the trigger signal, based on the trigger-type information, and that sets the information, generated by the AID generator, in the terminal ID field; and a transmitter that transmits the trigger signal generated by the trigger-signal generator. When the trigger-type information indicates random-access transmission, the AID generator generates information that is different from a terminal ID.

In the communication apparatus in the present disclosure, the AID generator generates information regarding allocation of resource units for random access as the information that is different from the terminal ID.

In the communication apparatus in the present disclosure, when a part is to be excluded from resource units for random access which are one contiguous band, the AID generator generates, as the information different from the terminal ID, information indicating the number of resource units in a contiguous partial allocation band and the number of resource units in an unallocation band.

In the communication apparatus in the present disclosure, when a part is to be excluded from resource units for random access which are one contiguous band, the AID generator generates, as the information different from the terminal ID, information indicating a start position and a size of resource units in an unallocation band.

In the communication apparatus in the present disclosure, when a part is to be excluded from resource units for random access which are one contiguous band, the AID generator generates, as the information different from the terminal ID, information indicating a pattern of a start and an end of resource units in an unallocation band.

In the communication apparatus in the present disclosure, the AID generator generates constraint information for a terminal as the information that is different from the terminal ID.

In the communication apparatus in the present disclosure, the AID generator deletes 1 octet of the information to be set in the terminal ID field.

A terminal in the present disclosure comprises: a receiver that transmits a trigger signal instructing transmission of an uplink signal; a determiner that determines, when trigger-type information indicating a type of trigger signal indicates random-access transmission, a resource unit for random access, based on information set in a terminal ID field in the trigger signal; and a generator that generates a random access signal by using the resource unit for random access, the resource unit being determined by the determiner.

In a communication in the present disclosure method, based on trigger-type information indicating a type of trigger signal instructing transmission of an uplink signal, the trigger signal is generated; when the trigger-type information is information indicating random-access transmission, information that is different from a terminal ID is set in a terminal ID field in the trigger signal; and the trigger signal is transmitted.

INDUSTRIAL APPLICABILITY

One aspect of the present disclosure is useful as being able to effectively utilize or reduce a redundant field.

REFERENCE SIGNS LIST

100 access point
200 terminal
101 RA-resource controller
102 Trigger Type determiner
103 AID generator
104 Trigger frame generator
105, 207 transmission-signal modulator
106, 202 wireless transmitter/receiver
107, 201 antenna
108, 203 reception-signal demodulator
109 quality estimator
204 Trigger frame decoder
205 RA resource determiner
206 RA generator

The invention claimed is:

1. An integrated circuit for a communication apparatus, the integrated circuit comprising, at least one input, which, in operation, inputs an electronic signal, and controller circuitry, which, in operation, controls:

receiving a trigger frame that solicits a station for a random access transmission, the trigger frame containing a user info field that includes an association identifier (AID) subfield, a Resource Unit (RU) allocation subfield, and a number of contiguous Random Access RUs (RA-RU) subfield, wherein one of a plurality of numbers is set to the AID subfield, "0" of the plurality of numbers indicates that no constraint of a functional capability of the station is imposed for the random access transmission, and a first non-zero number of the plurality of numbers indicates that a constraint of the functional capability of the station is imposed for the random access transmission; and performing the random access transmission based on the AID subfield.

2. The integrated circuit according to claim 1, wherein a first value of the RU allocation subfield indicates different RUs according to the AID subfield.

3. The integrated circuit according to claim 1, wherein the AID subfield is an AID12 subfield that indicates a part of an association identifier.

4. The integrated circuit according to claim 1, wherein the RU allocation subfield indicates one of a plurality of RUs, and patterns of the plurality of RUs are selected based on the AID subfield.

5. The integrated circuit according to claim 4, wherein a resource in a frequency domain indicated by the patterns of non-contiguous-band allocation.

6. The integrated circuit according to claim 1, wherein a common info field of the trigger frame contained a subfield that indicates the trigger frame is a variant trigger frame.

7. A communication method for a communication apparatus, the communication method comprising, receiving a trigger frame that solicits a station for a random access transmission, the trigger frame containing a user info field that includes an association identifier (AID) subfield, a Resource Unit (RU) allocation subfield, and a number of contiguous Random Access RUs (RA-RU) subfield, wherein:

one of a plurality of numbers is set to the AID subfield,

"0" of the plurality of numbers indicates that no constraint of a functional capability of the station is imposed for the random access transmission, and a first non-zero number of the plurality of numbers indicates that a constraint of the functional capability of the station is imposed for the random access transmission; and performing the random access transmission based on the AID subfield.

8. The communication method according to claim 7, wherein a first value of the RU allocation subfield indicates different RUs according to the AID subfield.

9. The communication method according to claim 7, wherein the AID subfield is an AID12 subfield that indicates a part of an association identifier.

10. The communication method according to claim 7, wherein the RU allocation subfield indicates one of a plurality of RUs, and patterns of the plurality of RUs are selected based on the AID subfield.

11. The communication method according to claim 10, wherein a resource in a frequency domain indicated by the patterns of non-contiguous-band allocation.

12. The communication method according to claim 7, wherein a common info field of the trigger frame contained a subfield that indicates the trigger frame is a variant trigger frame.

* * * * *